July 6, 1965　　　G. N. LEVESQUE ETAL　　　3,193,337
HYDROSTATIC BEARING
Filed Jan. 31, 1963　　　　　　　　　　　　　3 Sheets-Sheet 1

INVENTORS
GEORGE N. LEVESQUE
KENNETH E. ASHWORTH
BY Maxwell Tish ATT'Y

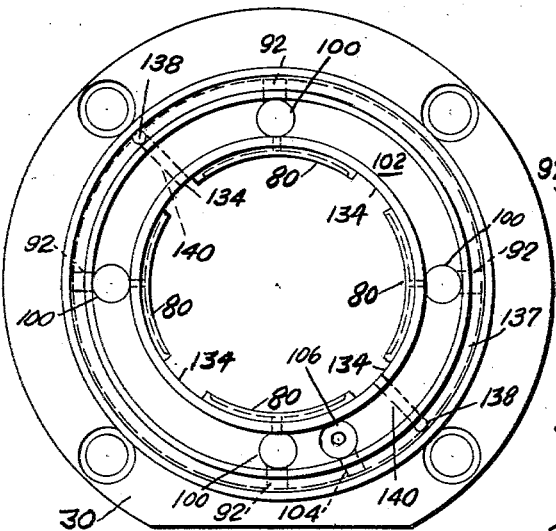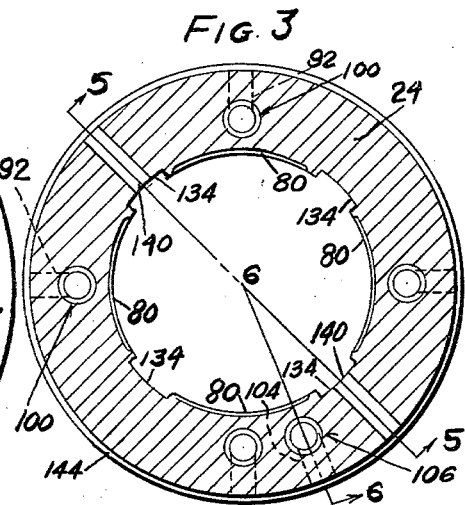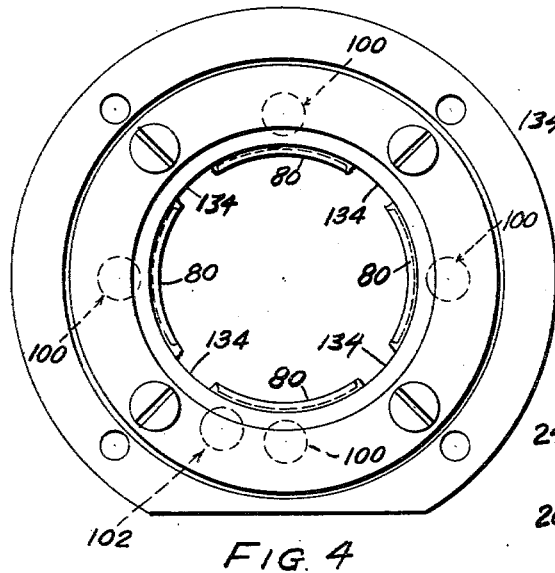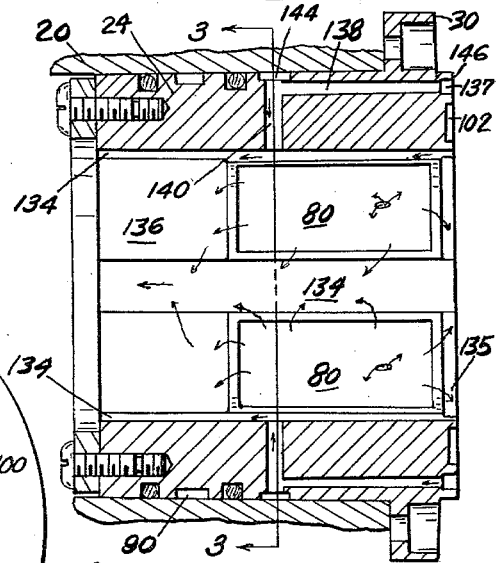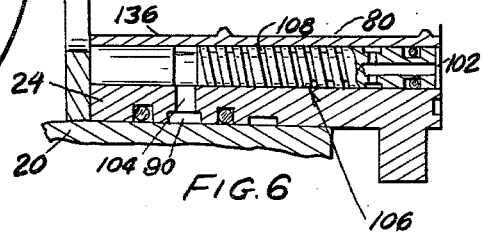

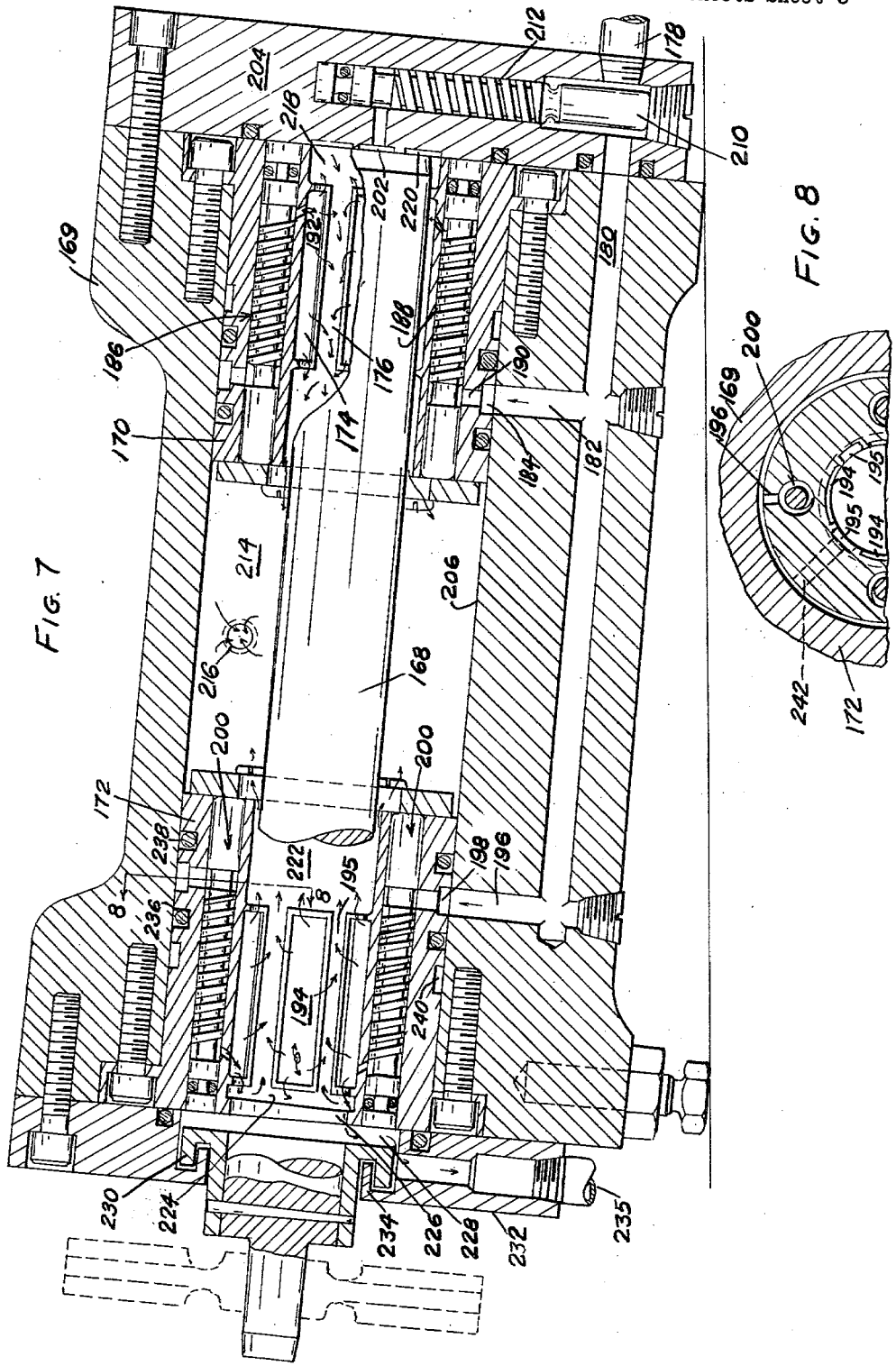

United States Patent Office 3,193,337
Patented July 6, 1965

---

3,193,337
HYDROSTATIC BEARING
George N. Levesque, Warwick, and Kenneth E. Ashworth, Woonsocket, R.I., assignors to Brown & Sharpe Manufacturing Company, Providence, R.I., a corporation of Rhode Island
Filed Jan. 31, 1963, Ser. No. 255,289
4 Claims. (Cl. 308—122)

The present invention relates to an improved hydrostatic bearing of the general type in which the rotating element is floated on one or more pads or cushions of a high pressure fluid medium such as oil which is contained in pockets provided, for example, by recessed portions of cooperating fixed bearing support surfaces which are spaced from the rotating element of the bearing sufficiently to permit a restricted flow of said pressure medium outwardly over the edges of said pockets into suitable drainage canals through which the fluid medium is returned to supply. The pressure fluid medium is normally confined within the bearing area by means of sealing devices which includes metal-to-metal and other friction-type contact seals to prevent dispersion of the fluid medium to atmosphere.

It is a principal object of the invention to provide in a hydrostatic bearing a novel construction and arrangement of the fluid medium supply system for the bearing including the several recessed pockets, conduit drainage areas, and associated separating bearing support surfaces, which will produce a more efficient flow of the pressure medium to and from the pocket forming recesses including a controlled reduction in pressure of the pressure medium leaving the pocket forming recesses, the channeling of the outgoing pressure medium to exhaust, and a further reduction in pressure of the pressure medium approaching the ends of the bearing to atmospheric level.

It is a further object of the invention to provide in a hydrostatic bearing, an improved construction and arrangement of the pressure oil distributing and return system for the bearing including devices for introducing a stepped reduction of pressure in the return system and labyrinth-type devices at the ends of the bearing which will entirely eliminate the necessity for friction sealing devices to prevent leakage of the oil from the bearing assembly.

With these and other objects in view as may hereinafter appear the several features of the invention consist also in the devices, combinations and arrangement of parts hereinafter described and claimed, which together with the advantages to be obtained thereby will be readily understood by one skilled in the art from the following description taken in connection with the accompanying drawings in which:

FIG. 2 is a detail view in end elevation looking from the right of the right hand sleeve bearing member shown in FIG. 1;

Figure 1:
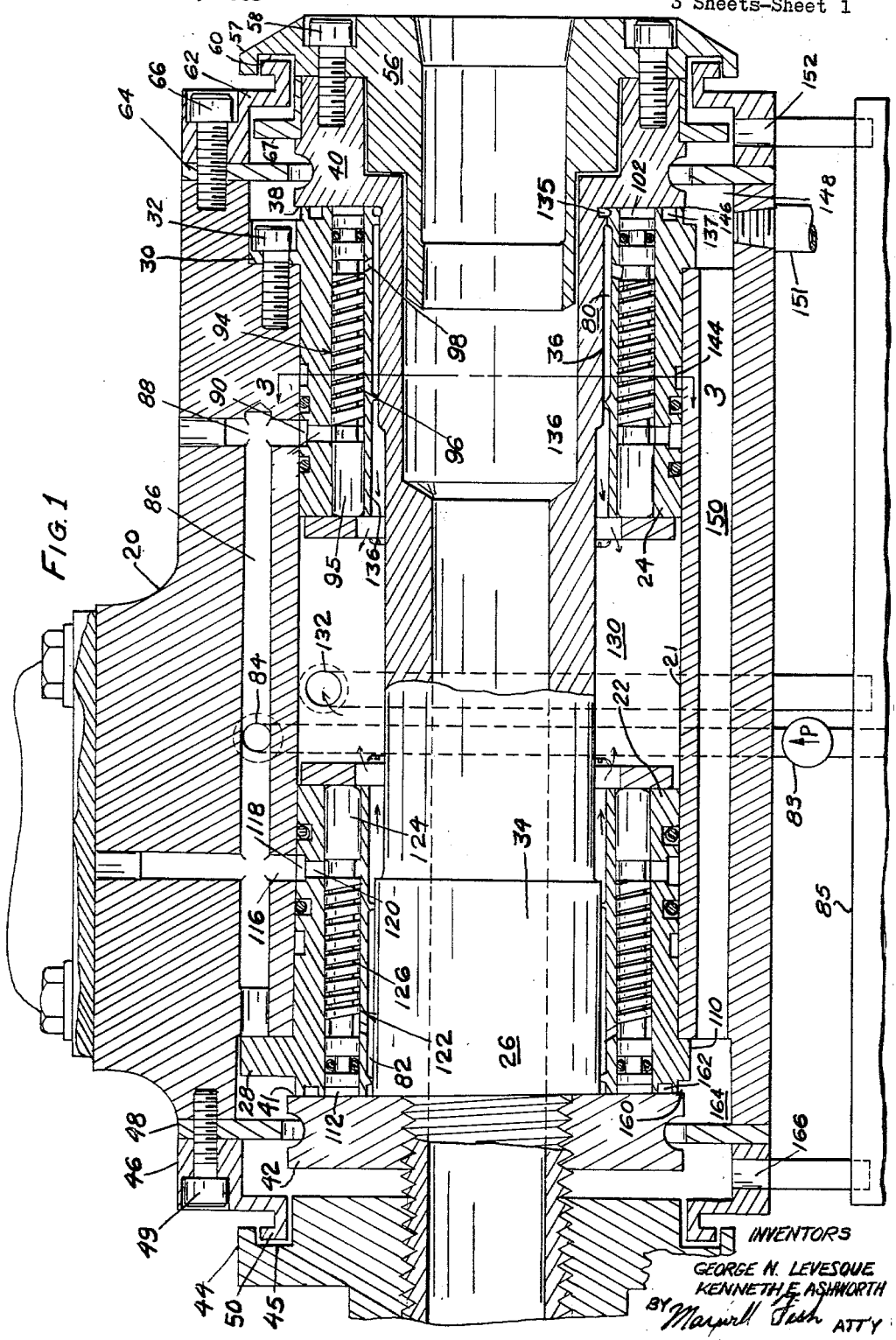
FIG. 1 is a sectional view in side elevation of a spindle bearing assembly in which the rotating spindle is supported hydrostatically both radially and axially.

FIG. 3 is a sectional view taken on a line 3—3 of FIG. 5 of the bearing member shown in FIGS. 2 and 5, the position of said section being also shown by a section line 3—3 in FIG. 1;

FIG. 4 is a detail end view of the hydrostatic bearing member shown in FIGS. 2, 3 and 5 looking from the left of FIG. 5;

FIG. 5 is a sectional view taken on a line 5—5 of FIG. 3 illustrating particularly the fluid pressure containing recessed pockets, conduits, draining areas, and associated separating bearing recesess, support surfaces formed in the sleeve bearing member particularly illustrated in FIGS. 2-6 inclusive;

FIG. 6 is a detail sectional view taken on a line 6—6 of FIG. 3 illustrating particularly the pressure reducing unit through which oil under pressure is channeled to the axial thrust hydrostatic bearing groove;

FIG. 7 is a sectional view in side elevation of a modified form of hydrostatic spindle bearing in which an axial thrust hydrostatic bearing area is provided at one end only of the spindle assembly; and FIG. 8 is a detail sectional view of the upper half of the left hand hydrostatic bearing member shown in FIG. 7 taken on a line 8—8 of FIG. 7.

The invention is herein disclosed in the preferred form as embodied in a hydrostatic spindle bearing assembly for use in a machine tool. In the embodiment shown in FIG. 1 the bearing assembly comprises a cylindrical housing 20 having formed therein a bore 21 to receive two sleeve bearing members 22 and 24 which are mounted in spaced relation to one another providing support for a rotating spindle designated at 26 in FIG. 1. The sleeve bearing member 22 has formed on its outer periphery a flange 28 which is fitted against and bolted to the shoulder formed at one end of the bore 21, and the sleeve bearing member 24 is similiarly provided with a flange 30 secured by bolts 32 to the shouldered opposite end of the bore 21 in the housing 20.

The spindle 26 is formed with two smooth cylindrical radial bearing surfaces 34 and 36 which cooperate with internal radial bearing support surfaces formed in the sleeve bearing members 22 and 24. The internal bearing support surfaces referred to are recessed as hereinafter set forth, the nonrecessed portions being of such diameter as to provide a clearance between the rotating and stationary elements of the bearings which will permit a restricted flow of the pressure fluid from the pocket forming recesses outwardly over the edges of said pockets. The spindle 26 is formed with axial thrust hydrostatic bearing faces formed respectively on the two flanged ends of the spindle. One end bearing face 38 of the rotating spindle is formed on the enlarged right hand end 40 of the spindle. An opposed end bearing face surface 41 of the spindle is formed on a sleeve disc 42 threaded to the opposite end of the spindle 26.

Each end of the spindle bearing assembly is formed with a labyrinth-type baffle arrangement formed of direction-changing opposed annular baffle surfaces fixed with relation to said spindle and housing respectively opening to atmosphere. Such a baffle when used with the improved hydrostatic bearing construction hereinafter more fully to be described is adequate to seal in and prevent leakage of the fluid medium from the hydrostatic bearing. The labyrinth baffle arrangement provided at the left hand end of the spindle assembly comprises a sleeve member 44 threaded to the reduced left hand end of the spindle, said sleeve member having formed in the inner face thereof an annular groove 45. A ring member 46, secured together with an intervening baffle washer 48 to the end of the housing 20 by bolts 49, is formed with a longitudinally outwardly bent annular extension 50 which conforms with the groove 45 in the sleeve member 44, but is at all points spaced therefrom to provide the baffle arrangement referred to.

A somewhat similar labyrinth is provided at the right hand end of the spindle bearing assembly as shown in FIG. 1 which comprises a sleeve chucking member 56 having a sleeve hub which is fitted into an expanded end portion of the spindle bore, and an outwardly flanged portion 57 which is rigidly secured to the spindle 26 by means of bolts 58. The inner face of the flanged portion 57 is formed with a groove 60. Cooperating labyrinth baffle surfaces are provided between the grooved inner surface of the flanged portion 57, and the flanged inner edge of a ring member 62, and washer 64 which are rigidly secured to the right hand end of the housing 20 by bolts 66. Additional baffle surfaces are provided by a washer 67 secured to the enlarged portion 40 of the spindle 26.

Hydrostatic radial thrust support is provided for the spindle 26 by means of high pressure oil cushions provided by pockets of high pressure oil maintained in recesses formed in the cylindrical internal bearing support surfaces of the respective sleeve bearing members 22 and 24. Hydrostatic axial thrust support is provided by means of high pressure oil cushions provided by pockets of high pressure oil maintained in annular recesses formed in the outer end faces of the respective sleeve bearing members 22 and 24. The radial thrust pocket forming recesses for the sleeve bearing member 24, four in number, are designated at 80 in FIGS. 1, 2, 3 and 5 and are equally spaced about the circumference of the internal bearing wall of the sleeve bearing member 24. The bearing member 22 is similarly provided with radial thrust pocket forming recesses 82 as indicated in FIG. 1.

High pressure oil is supplied to the pocket forming recesses 80 through a pressure oil supply system, which comprises a high pressure inlet 84 formed in the housing 20 (see FIG. 1), to which oil may be supplied by a pump 83 and connecting pipe from a reservoir 85, and which connects with a longitudinally extending manifold in the form of an axial bore 86 in the housing. Oil passes from the manifold 86 through a radial passage 88 into an annular groove 90 formed in the peripheral surface of the sleeve bearing member 24, and thence through four radial passageways 92 and pressure reducing units 94 connected thereto to respective pocket forming recesses 80. As shown, for example, in FIG. 1 the annular groove 90 is connected by the radial passageway 92 with one of the pressure reducing units 94 referred to comprising an axially disposed plug 95 mounted in an axial bore in the sleeve bearing member 24. A spiral pressure reducing groove 96 formed on the periphery of the plug 95 is connected at one end to the radial passageway 92 and at its other end to an inlet 98 for the respective pocket forming recess 80. Pressure oil is applied in a similar manner from the annular groove 90 through similar pressure reducing units 94 to each of the pocket forming recesses 80. It will be understood that the inlet pressure admitted through the inlet 84 may be in the order of 400 p.s.i. which is subsequently reduced during the passage through the pressure reducing units 94 to approximately 200 p.s.i. for use as a hydrostatic cushion in each said pressure bearing pocket 80.

Hydrostatic axial thrust support for the spindle 26 with respect to the sleeve bearing member 24 is provided by a pocket forming annular recess 102 formed in the outer end face of the sleeve bearing member 24. Oil at the inlet pressure flows from the manifold 86 through conduit 88 and the annular passageway 90 to a radial conduit 104 (see FIG. 6) which connects with an oil pressure reduction unit 106 which in turn delivers oil at the desired pressure to the annular pocket forming recess 102. The oil reduction unit 106 comprises a plug axially disposed in the sleeve bearing member 24, and having formed in the periphery thereof a spiral groove 108 through which oil passes from the conduit 104 into the pocket forming recess 102.

The sleeve bearing member 22 which provides support for the left hand end of the spindle 26 as shown in FIG. 1 is in all respects similar to the sleeve bearing member 24 above described being formed at its outer end with flange 28 which abuts and is secured to the adjacent end face of the housing 20 by means of bolts (not shown) which are similar to the bolts 32 by means of which the right hand sleeve bearing member 24 is secured in place. Hydrostatic radial thrust support is proivded by the four radial thrust pocket forming recesses 82 above referred to, and hydrostatic axial thrust support is provided by a pocket forming annular recess 112 formed in the end face of the sleeve bearing member 22. Oil is supplied to the pocket forming recesses 82 from the manifold 86 through a radial duct 116 which connects with an annular groove 118 formed in the external surface sleeve bearing member 22. Oil passes from the groove 118 to each of the pocket forming recesses 82 through radial ducts 120 which connect respectively with the ends of oil pressure reducing units 122 each of which is connected at its opposite end with one of the recesses 82. The units 122 are identical with those previously described, each consisting of a plug 124 inserted in an axially extending bore in the sleeve bearing member 22 and having a spirally formed groove 126 which is of such diameter and length to cause the pressure of oil to be reduced from an initial pressure of 400 p.s.i. to a cushioning pressure of 200 p.s.i. Oil is supplied to the annular recess 112 from manifold 86 and annular groove 118 through a pressure reduction unit (not specifically shown) which is identical with that illustrated in FIGS. 3 and 6 for supplying the hydrostatic axial thrust bearing pocket forming recess 102.

In the illustrated construction, the overflow of oil from the hydrostatic pressure pocket forming recesses through the clearance spaces provided between the rotating spindle and the non-recessed bearing support areas surrounding said recesses is contained and returned to an oil supply reservoir (not specifically shown) by means of a novel and improved drainage system of such efficiency as to permit the use of labyrinth-type closures at the open ends of said bearings, and to avoid entirely any metal-to-metal or other friction sealing contacts between the relatively rotating and fixed elements of the bearing assembly. The drainage system referred to comprises a series of recessed conduits and drainage areas formed in the bearing support surfaces surrounding said pocket forming recesses which provide a closed low pressure drainage system maintained at a predetermined above-atmospheric pressure which may, for example, be ½ p.s.i., and which further provide outwardly of said low pressure drainage system toward the open end or ends of the bearing assembly, a second system of recessed conduits and drainage areas separated from said low pressure drainage recesses by further intervening narrow strips of non-recessed bearing support surface. The latter drainage system is connected to atmosphere by means of a labyrinth-type seal which is effective to confine the small amount of oil flowing into said latter drainage system. A sufficient clearance is provided between the rotating spindle and the non-recessed portions of the bearing support surfaces of the sleeve bearing members to prevent any possibility of metal-to-metal contact therebetween when the bearing is pressurized.

The operation of the oil supply and drainage system for the hydrostatic bearing assembly herein described is briefly as follows:

Oil supplied at a relatively high pressure which may be in the order of 400 p.s.i. is channeled through pressure reducing units into pocket forming recesses provided in the relatively fixed bearing support surfaces of the bearing assembly providing pads of oil which are maintained by said pressure reducing units at an intermediate work pressure which may be in the order of 200 p.s.i. A sufficient clearance is provided between the rotating spindle and the non-recessed strip areas of the bearing support surfaces which form the edges of the pocket forming recesses to avoid a metal-to-metal contact. There is a continuous restricted flow of oil from the pockets over the separating surfaces referred to into the adjacent recessed drainage conduits of the low pressure drainage system. A major portion of this oil is collected and drawn off through the low pressure drainage system. Since this drainage pressure is maintained somewhat above atmospheric pressure, an additional small flow of oil may be expected from the low pressure drainage areas over the further intervening strips of non-recessed bearing support surface above referred to into the more outwardly disposed atmosphere connected drainage system. Any such oil is, however, effectively trapped by the labyrinth-type seal because this leakage has been sufficiently reduced.

With this arrangement of the drainage conduits all of the oil flow from the hydrostatic pressure pocket forming recesses is collected and drained away without any tendency of oil seepage through the labyrinth-type closures provided, thus eliminating the usual metal-to-metal contact or friction-type seals, used in hydrostatic-type bearings.

The low pressure drainage system above referred to comprises a cylindrical chamber 130 within the housing 20 surrounding the middle portion of the spindle 26 and bounded at its ends by the two spindle bearing members 22 and 24. An outlet 132 which may be connected with the reservoir 85 is provided from the area 130 of such length and diameter as to have a low restrictive effect to keep the back pressure as low as ½ p.s.i. in the drainage system. Further elements of the system comprise for each bearing a series of four splines 134 (see FIGS. 2–5) in the form of longitudinal recesses in the bearing surfaces which alternate with the pocket forming recesses 80 and at their inner ends drain into the cylindrical low pressure area 130 between the sleeve bearing members 22 and 24. Additional low pressure drainage areas 136 are provided which lie adjacent the inner ends of the pocket recesses 80 between the splines 134, and drain into the cylindrical low pressure drainage chamber 130.

It will be noted from an inspection of FIG. 1 that the outlet 132 of the low pressure drainage system is positioned at a higher level than any of the bearing pockets of the bearing assembly so that the pocket forming recesses are at all times immersed in oil to insure that no air is trapped in the bearing area. In this way it is made certain that no air will be carried into the pockets at high spindle speeds.

Oil flowing outwardly from the outer or right hand ends of the pocket forming recesses 80 as shown in FIGS. 1 and 5 is carried off through an annular groove 135 formed in the end of the radial bearing surface which connects with the end of each of the low pressure drainage splines 134.

Oil flow occurring from the axial thrust pocket forming annular recess 102 passes over a narrow partitioning portion of the shouldered end bearing surface of the sleeve bearing member 24 into an outwardly disposed annular low pressure oil discharge groove 137, which is connected by two axially extending passageways 138 (see FIGS. 2 and 5) and a radial bore 140 with two diametrically opposite splines 134.

Oil seepage which might occur between the sleeve bearing member 24 and housing 20 outwardly along the bearing from the annular high pressure oil inlet passageway 90, is drawn off through a low pressure annular passageway 144 which connects with two radial grooves 140, and thence with the respective splines 134.

As best shown in FIG. 1 the only lubricated bearing surface which lies adjacent to, and from which oil may be discharged at atmospheric pressure into the drainage area adjacent the labyrinth closing the outer end of the bearing consists in the narrow annular strip of end bearing surface 146 which lies radially outwardly from and forms the outer edge of the annular end bearing low pressure drainage groove 137. A small amount of oil seepage may be expected across this lubricated end bearing surface area into the annular drainage area 148 bifurcated by the washer 64, where the oil is finally trapped and caused to drain by gravity into a longitudinal exhaust conduit 150 and out through a drain return port 151. A port 152 disposed to the outside of washer 64 is used for waste oil which may splash over washer 64 or as a safe exit for any externally used fluid which may seep in through the opening around flange 57.

The hydrostatic oil pressure system associated with the sleeve bearing member 22 which is identical with the system above described in connection with sleeve bearing member 24 includes the radial hydrostatic pressure pocket forming recesses 82 and the axial hydrostatic pressure pocket forming annular groove 112, and an identical low pressure drainage system which causes oil seepage from said pockets to be drawn off through the central cylindrical drainage area 130. Since this latter hydrostatic oil pressure system is identical in every respect with the hydrostatic oil pressure system above described and specifically illustrated in FIGS. 3, 5 and 6 associated with the sleeve bearing member 24, no detailed disclosure thereof is believed necessary. As shown in FIG. 1 any oil seepage which may occur from the lubricated end bearing surface area 160 separating the low pressure annular drainage groove 162 of sleeve bearing member 22 corresponding respectively to end surface 146 and low pressure drainage groove 136 of sleeve bearing member 24, is collected in the longitudinal exhaust conduit 150 and a cylindrical drainage chamber 164 connected with atmosphere by the adjacent labyrinth, and is returned to the reservoir through the longitudinal exhaust conduit 150 and drain return port 151 as above set forth. A port 166 disposed to the outside of washer 48 is used for waste oil which may splash over the washer 48, or as a safe exit for any externally used fluid which may seep in through the open end of the bearing.

FIGS. 7 and 8 illustrate a modified form of a hydrostatic spindle bearing for a rotary spindle 168, comprising with a housing 169, two sleeve bearing members 170 and 172, one of which is provided with both radial and axial hydrostatic load bearing oil pockets, the other having only radial hydrostatic load bearing pockets. The sleeve bearing member 170 is provided with four evenly spaced radial pocket forming recesses 174, similar to those previously described, with longitudinally extending splines 176 disposed therebetween. Oil at a high pressure which may be in the order of 400 p.s.i. is channeled into the housing 169 through an inlet port 178 and a longitudinally extending manifold 180 which is connected by a radial duct 182 with an annular groove 184 formed in the outside surface of the sleeve bearing member 170. Oil under high pressure is directed from the annular groove 184 to each of four identical pressure reducing units 186 each comprising a longitudinally extending plug having a spirally extending groove 188 connected at one end with an inlet 190 from the annular groove 184 and at its other end with an outlet 192 to one of the pocket forming recesses 174.

The left hand sleeve bearing member 172 is similarly formed with radial pocket forming recesses 194 separated by longitudinal splines 195. Oil at the desired pressure is directed to the respective pocket forming recesses 194 from the manifold 180 through a conduit 196, an annular groove 198 and an associated pressure reducing unit 200.

In the embodiment of the invention shown in FIG. 7 an axial thrust hydrostatic bearing is provided for the right hand or lower end of the inclined spindle 168 which takes the form of a circular axially centered pocket forming recess 202 formed in an end plate 204 which closes the right hand end of the bearing supporting bore 206 of the housing 169.

Oil at the desired pressure is supplied to the end thrust pocket forming recess 202 by means of an oil pressure reducing unit which comprises a plug 210 fitted into a bore radially disposed with relation to the spindle axis in the end plate 204, and having a spiral pressure reducing groove 212 connected at one end to the manifold 180 and at its other end to the pocket forming recess 202.

The bearing assembly illustrated in FIGS. 7 and 8 is provided with completely closed-in hydrostatic radial and end thrust oil bearing pockets at one end and radial oil bearing pockets only at the other end. A leak-proof arrangement of said left hand end of the bearing assembly having radial bearing pockets only is provided in which the open end of the bearing is closed by means of a labyrinth-type seal thus entirely eliminating any metal-tometal or other type of friction contact which might interfere with the extremely accurate centering of the spindle required.

Referring particularly to the right hand sleeve bearing member 170, each of the radial pocket forming recesses 174 is formed with a narrow surrounding area of bearing surface 174 and adjacent thereto with drainage recesses from which oil flow from the pocket forming recesses is carried off at a low pressure of approximately ½ p.s.i. back pressure. The drainage system referred to includes a cylindrical drainage chamber 214 provided within the bore 206 of the casing 200 and bounded at its ends by the two sleeve bearing members 170, 172. Oil is exhausted from the chamber 214 through an outlet 216 which is constructed and arranged to have a low restrictive effect to keep the back pressure at a low level preferably not more than approximately ½ p.s.i. As in the case of the low pressure outlet 132 shown in FIG. 1, the outlet 216 is located in a position substantially above the level of the bearing pockets to insure that no air is trapped in the bearing area, and thus to avoid any possibility that air will be carried into the pockets when the spindle is driven at high speeds.

Oil flow from the bearing surface area enclosing the outer or right hand ends of the pocket forming recesses 174 drains into a recessed annular drainage area 218 formed in the end portion of the sleeve bearing member 170 and thence through the connecting splines 176 to the cylindrical drainage chamber 214 and exhaust. Oil flow from the bearing surface areas surrounding the axial thrust pocket forming recess 202 in the end plate 204 is collected in a ring-shaped recess 220 formed concentrically with and outwardly of the pocket forming recess 202. The recess 220 opens into the annular drainage area 218 and thus forms part of the low pressure oil drainage system of the bearing assembly.

Oil from the bearing surface areas enclosing the radial pocket forming recesses 194 in the left hand sleeve bearing member 172 flows into the interposed splines 195, and into adjacent end areas 222 which connect with the cylindrical drainage area 214, and into an annular groove 224 which is located adjacent the outer end of the sleeve bearing member 172 and opens into each of the splines 195. The recessed areas described form part of the low pressure oil drainage system by means of which most of the oil flow from the several hydrostatic pressure pocket forming recesses 194 is drained away.

The bearing assembly shown in FIG. 7 is set up so that the spindle 168 rotates on an axis somewhat inclined from the horizontal. The weight of the spindle assembly is relied upon to bias the right hand or lower end of the spindle 168 against the hydrostatic cushioning pad of oil provided by the end thrust bearing pocket forming recess 202. The opposite or left hand end of the bearing assembly is free to move longitudinally thus permitting complete freedom of adjustment of the spindle axially with relation to the end thrust bearing provided by the pocket forming recess 202.

In order to avoid any leakage of oil from the upper or left hand end of the bearing assembly an additional annular strip of non-recessed bearing support surface 226 is provided which forms an annular ridge adjacent the end of the sleeve bearing member enclosing the annular groove 224.

Any oil flow which may occur over the surface 226 is trapped in a cylindrical chamber 228 connected to atmosphere by a labyrinth consisting of a grooved member 230 secured to the spindle and an overlying end plate 232 which is secured to the housing 169 and is formed with a lip 234 which conforms to but is spaced from the grooved member 230. Any oil collected in this manner is returned to the machine reservoir through an outlet 235.

It will be noted from an inspection of FIGS. 7 and 8 that oil seepage which may occur from the high pressure oil carrying annular groove 198 along the engaging surfaces of the sleeve bearing member 172 and the supporting wall of the bore 206 formed in the housing 169, is arrested by two O-rings, 236, 238, one at each side of the annular groove 198. Any oil which may be forced past the O-ring 236 is collected in an annular low pressure drainage groove 240 which is connected by a radial passage 242 (see FIG. 8) with one of the splines 195.

The invention having been described what is claimed is:

1. A hydrostatic bearing assembly which comprises with a rotating member having a smooth bearing surface, a housing, a bearing member mounted within the housing having an open ended cooperating bearing support surface spaced from said bearing surface to permit a restricted flow of a pressurized load bearing fluid therebetween, said bearing support surface having formed therein hydrostatic pressure pocket forming recesses, a closed low pressure drainage system comprising drainage recesses surrounding said pocket forming recesses, non-recessed strip areas of said bearing support surface providing separating ridges between each said pocket forming recess and said surrounding low pressure drainage recesses, and a drainage outlet for said system sufficiently open to effect discharge of said fluid from said system at a low pressure in the order of less than ½ p.s.i., a second drainage system discharging at atmospheric pressure to the open end of said bearing member comprising a labyrinth-type baffle formed of direction-changing opposed annular baffle surfaces fixed with relation to said rotating member and housing respectively and opening to atmosphere, an annular drainage area interposed between said internal bearing support surfaces and said baffle, and a non-recessed strip area of said bearing support surface disposed between said low pressure drainage recesses of said low pressure drainage system and said annular drainage area, and means for supplying fluid under pressure to said pockets, causing said fluid under pressure to flow over said first mentioned ridge forming separating ridges into said first drainage system, whereby the bulk of said fluid drains at low pressure through said drainage outlet, causing a small seepage only of said low pressure drainage fluid over said latter mentioned separating ridges into said atmospheric pressure drainage system.

2. A hydrostatic bearing assembly which comprises with a spindle having smooth bearing surfaces spaced from one another, a housing, a pair of sleeve bearing members spaced from one another in the housing defining a drainage chamber in said housing between said sleeve bearing members, with bearing support surfaces spaced from said spindle bearing surfaces to provide clearance for a restricted flow of liquid under pressure between said surfaces and providing at least one open end between said spindle and bearing support surfaces, said bearing support surfaces having hydrostatic pressure pocket recesses, low pressure drainage recesses surrounding each said pocket and draining into said drainage chamber, and non-recessed strip areas of said bearing support surfaces providing separating ridges between said pockets and said low pressure drainage recesses, a drainage outlet from said chamber positioned at a higher level in said housing than any said hydrostatic bearing pocket forming recess thereby immersing said pocket forming recesses in said liquid, said drainage outlet being sufficiently open to effect said drainage at a low pressure in the order of less than ½ p.s.i., means connecting said low pressure drainage recesses to atmosphere including a labyrinth baffle formed of direction-changing opposed annular baffle surfaces fixed with relation to said rotary member and housing, respectively, and opening to atmosphere, an annular drainage area interposed between said internal bearing support surface and said baffle, a non-recessed strip area of said bearing support surface disposed between said low pressure drainage recesses and said drainage area, and means for supplying liquid at substantial pressure to each said pocket causing said liquid under pressure to flow over said first-mentioned separating ridges into said drainage recesses, whereby the bulk of said liquid drains at a low pressure through said chamber and low pressure drainage outlet, causing a small seepage only of said liquid over the separating ridge to said annular drainage area for drainage to atmosphere.

3. A hydrostatic bearing assembly which comprises with a spindle having smooth radial and end axial bearing surfaces, a housing, a sleeve bearing member secured within said housing with cooperating radial and axial bearing support surfaces spaced from said spindle radial and axial bearing surfaces to provide clearance for a restricted flow of fluid under pressure between said surfaces and further providing an open end between said spindle and sleeve bearing member surfaces, said sleeve bearing member radial support surface having a plurality of hydrostatic pressure pocket forming recesses spaced about the circumference of said radial support surface, low pressure drainage recesses surrounding each said pocket, and non-recessed strip areas of said radial bearing support surface provided separating ridges between said pockets and said low pressure drainage recesses, said axial bearing support surface having formed therein a circuit pocket forming recess coaxial with the spindle axis of rotation, an annular low pressure drainage recess in said axial bearing support surface surrounding said circular pocket forming recess, a non-recessed strip area of said axial bearing support surface providing a separating ridge between said circular pocket and said annular drainage recess, drainage connections from said low pressure drainage recesses including a drainage outlet sufficiently open to effect said drainage at a pressure in the order of less than ½ p.s.i., an annular drainage area formed in said housing outwardly of said annular low pressure drainage recess in said axial bearing support surface, a labyrinth-type baffle formed of direction-changing opposed annular baffle surfaces fixed with relation to said rotating member and housing opening to atmosphere and connected with said annular drainage area opening to atmosphere, and means for supplying fluid under pressure to said pockets producing a flow of said fluid under pressure over adjacent ridges into said low pressure drainage recesses, whereby the bulk of said fluid drains at low pressure through said low pressure drainage outlet causing a small seepage only of said fluid over said ridge between said annular low pressure drainage recess and annular drainage area.

4. A hydrostatic bearing assembly which comprises with a spindle having smooth radial and axial bearing surfaces, a housing, sleeve bearing members within which said spindle is mounted to turn on an inclined axis secured within said housing spaced from one another to define a low pressure drainage chamber extending between said members, the lower of said members having cooperating radial and axial bearing support surfaces and the upper of said members having radial bearing support surfaces spaced from said spindle radial and axial bearing surfaces to provide clearance for a restricted flow of fluid under pressure between said surfaces and further providing an open end between the spindle and the upper of said sleeve bearing member surfaces, each said bearing support surface having formed therein hydrostatic pressure pocket forming recesses, drainage recesses surrounding said pocket forming recesses connected with said chamber, a low pressure drainage outlet from said chamber sufficiently open to effect said drainage at a low pressure in the order of less than ½ p.s.i., non-recessed strip areas of said bearing surfaces forming separating ridges between each said pocket forming recess and said low pressure drainage recesses, an annular drainage area draining at atmospheric pressure provided within said housing between the open end of said upper sleeve bearing member and adjacent low pressure drainage recesses, a non-recessed strip area of the radial bearing support surface of said upper sleeve bearing member providing a separating ridge between said annular drainage area and adjacent low pressure drainage recesses, a labyrinth-type baffle formed of direction-changing opposed annular baffle surfaces fixed with relation to said rotating member and housing respectively opening to atmosphere connected with said annular drainage area, and means for supplying fluid under pressure to each said pocket whereby fluid is forced at said pressure over adajcent pockets into said drainage recesses, causing the bulk of said fluid to drain through said low pressure drainage outlet and the seepage of the remaining portion of said fluid over said latter mentioned separating ridge into said atmospheric pressure annular drainage area.

References Cited by the Examiner
UNITED STATES PATENTS 2,660,484 11/53 Gerard et al. _____ 308—122
2,919,960 1/60 Whitney _____ 308—122
2,998,999 9/61 Morser et al. _____ 308—122

ROBERT C. RIORDON, *Primary Examiner.*

FRANK SUSKO, *Examiner.*